G. F. GOODING.
TOOL FOR REMOVING BROKEN SCREWS AND BOLTS.
APPLICATION FILED AUG. 23, 1919.
1,366,647.
Patented Jan. 25, 1921.
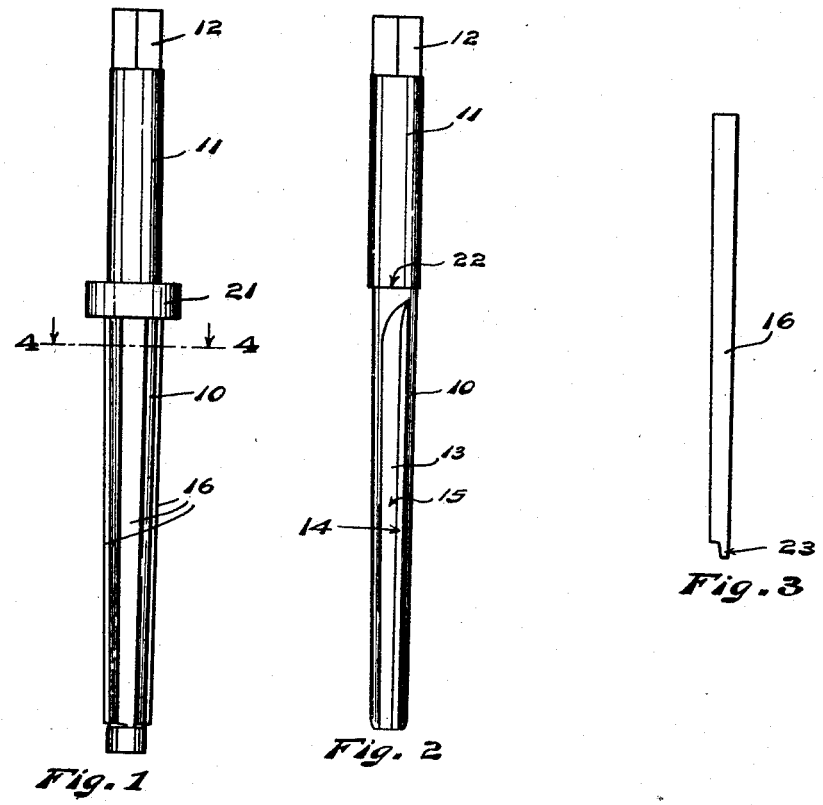
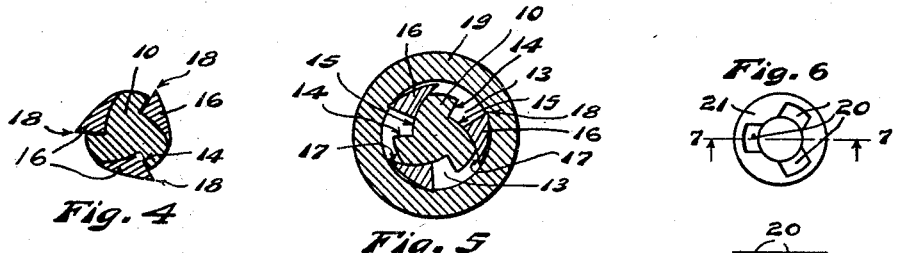
Inventor
George F. Gooding
By His Attorney
Fred C. Matheny

UNITED STATES PATENT OFFICE.

GEORGE F. GOODING, OF SEATTLE, WASHINGTON.

TOOL FOR REMOVING BROKEN SCREWS AND BOLTS.

1,366,647.        Specification of Letters Patent.       Patented Jan. 25, 1921.

Application filed August 23, 1919. Serial No. 319,498.

*To all whom it may concern:*

Be it known that I, GEORGE F. GOODING, a citizen of the United States, residing at Seattle, in the county of King and State of Washington, have invented a certain new and useful Improvement in Tools for Removing Broken Screws and Bolts, of which the following is a specification.

My invention relates to improvements in tools for removing pieces of broken screws, bolts, studs and the like from the threaded holes in members into which they have been screwed and the object of my improvement is to provide a tool of strong and simple construction which may be inserted within a hole that has been drilled in a broken stud or bolt and which is adapted to automatically grip the sides of the hole in the broken stud or bolt so that when the tool is turned the broken stud or bolt will be unscrewed.

In handling machinery it often happens that set screws, bolts and the like are twisted or broken off and that it is desired to remove the broken part from the threaded part into which it is screwed. This is usually done by drilling a hole into the broken bolt or set screw, then driving some tool as a chisel into the hole and then turning the chisel or tool to unscrew the broken piece. This method is not satisfactory because it is difficult to drive any tool into a hole in a broken bolt or screw and have such tool hold firmly enough so that the broken part can be removed, the tool usually expanding the broken bolt or screw when it is driven in, thereby making it harder to turn and then slipping when an attempt is made to turn it, thus occasioning considerable annoyance and loss of time. My invention overcomes these difficulties by providing a tool that will automatically take hold of and lock itself to a broken bolt or stud when it is inserted within a hole in such stud or bolt and turned.

The invention consists in the novel construction, adaptation and combination of parts of a tool for removing broken studs and bolts as will be more clearly hereinafter described and claimed.

In the accompanying drawings Figure 1 is a view in side elevation of a tool constructed in accordance with this invention; Fig. 2 is a view in side elevation of the body of the tool with the working parts removed; Fig. 3 is a detached view in elevation of one of the blades; Fig. 4 is an enlarged view in cross section on broken line 4, 4 of Fig. 1 showing the bolt or stud engaging blades in a retracted position; Fig. 5 is a view in cross section similar to Fig. 4 except that the blades are shown in operative engagement with a member that is to be turned; Fig. 6 is a plan view of the bottom of the collar that forms a part of the invention; Fig. 7 is a view in cross section on broken line 7, 7 of Fig. 6 of the same collar and Fig. 8 is a fragmentary view in cross section showing the construction of the outermost end or tip of the device.

Like reference numerals designate like parts throughout the several views.

Referring to the drawings: I have shown a tool that is preferably made from a relatively long straight piece of steel and consists of a slightly tapered body portion 10 and a shank 11 that terminates in a squared end 12 on which a wrench may be placed for turning the tool.

The body portion 10 is provided with a plurality of longitudinally extending grooves 13 each having one straight wall 14 that intersects the periphery of the body portion at substantially right angles thereto and one curved wall 15 that intersects the base of the wall 14 at substantially right angles and that merges into the periphery of the body portion at a distance from the straight wall 14.

The grooves 13 are each adapted for the reception of a bolt or stud engaging blade 16 that is of substantially triangular cross section except that its inner wall is curved as at 17 to fit the curved wall 15 of the notches, and its outer wall is slightly curved to give it a better shape and to give the finished tool a neater and more symmetrical appearance. The blades 16 are each provided with a relatively sharp edge 18 that is adapted to engage with and lock against the walls of the recess in any member 19 (see Fig. 5) in which the tool is inserted when the tool is turned in a contra clockwise direction.

The upper ends of the blades 16 are adapted to fit within notches 20 in a collar 21 which is free to turn on the body member 10 and is arranged to abut against a shoulder 22 at the junction of the body members 10 and shank 11.

The bottom ends of the blades 16 are each provided with lugs or projections 23 that are adapted to be inserted within a sleeve 24 that is secured by a screw 25, see Fig. 8, to the bottom end of the body member 10.

The collar 21 and sleeve 24 limit the distance that the blades 16 may be moved away from the central axis of the tool and hence prevent the blades from becoming entirely displaced from the grooves 13.

In operation the tool is inserted into the bore of a member, as a broken screw or bolt that is to be turned, and such tool is then turned in the proper direction to cause the sharp edges 18 to engage with and dig into the wall of the bore in the broken bolt or screw. As the tool is turned the curved walls 15 of the body member exert an outward thrust or wedging effect against the curved walls 17 of the blades thereby causing the blades to firmly engage with or lock against the walls of the bore in the broken screw or bolt so that such broken screw or bolt will be turned with the tool.

If desired the tool may be made straight instead of being given the slight taper shown in the drawings. When this is done it may be necessary after the tool is inserted in a hole to give the collar 21 a slight turn on the shank to thereby throw the knife edges 18 outwardly into engagement with the walls of the hole so that they will wedge and lock as soon as the tool is turned.

In tools of very small size, it may be found convenient to provide one locking blade only while in the larger size tools more than one of the blades will preferably be used. In practice I have found three blades very satisfactory for larger size tools but it will be understood that at this time I contemplate the use of one or more blades as may be found most advantageous and also contemplate the use of both straight and tapered tools.

Obviously the tool will operate in exactly the same manner for turning any other perforated device in which it may be inserted as it will for turning a broken nut or bolt that has a hole bored therein.

It will be understood that changes in the form of construction and arrangement of the various parts of this device may be made within the scope of the following claims.

What I claim is:—

1. A tool of the class described comprising a body member of substantially circular cross section having longitudinally extending grooves that are each formed with a substantially radial side wall and an inclined bottom wall that intersects the base of said side wall and terminates in the periphery of said body member, a blade member of substantially triangular cross sectional shape disposed within each of said grooves and having an inclined wall that is slidable on the inclined wall of said groove, said blade members having relatively sharp edges that project outward beyond the circumference of said body member, and holding means for said blade members.

2. A tool for engaging the walls of a circular aperture comprising a body member having longitudinally extending grooves that are each formed with a substantially radial side wall and a convex bottom wall that intersects the base of said side wall and merges with the periphery of said body member, blade members disposed within said grooves and having concave walls that fit the convex walls of said slots, the said blade members being arranged to be moved outwardly by the wedging effect between the convex walls of the slots and the concave walls of the blade members when the tool is turned in one direction to cause said blade members to engage with the wall of a circular aperture in which said tool may be inserted and means for supporting each of said blade members at both ends.

3. A tool for engaging the walls of a circular aperture comprising a shank, a body portion on said shank, said body portion having a plurality of longitudinally extending grooves of substantially triangular cross-sectional shape, a blade member of substantially triangular cross-sectional shape disposed within each of said grooves and arranged to be moved outwardly by the wedging effect that is produced by the wall of the groove on the wall of the blade members when the tool is turned in one direction, a notched collar rotatable on the upper end of said body member, the upper ends of said blades being arranged to project within the notches in said collar, a cylindrically recessed sleeve secured to the tip end of said body member and a lug on the tip end of each of said blades and arranged to project within the recess in said sleeve.

4. A tool of the class described comprising a shank, a squared portion on said shank, a tapered body portion integral with said shank, said body portion having longitudinally extending grooves each of said grooves having a flat substantially radial wall and a convex wall that intersects the base of the flat wall at substantially right angles and that merges into the periphery of said body portion at a point removed from said flat wall, blade members arranged to fit within said grooves, each of said blade members having a concave inner wall that fits the convex wall of said groove and a straight wall that is arranged to abut against the radial wall of said groove and terminates in a sharp edge that projects beyond the periphery of said body member, a notched collar arranged to fit loosely over said body member, the upper ends of said blades being adapted to fit within the notches in said collar, a cylindrically recessed sleeve rigidly secured to the tip end of said body member and lugs on the tip ends of said blades arranged to project within said sleeve.

In witness whereof, I hereunto subscribe my name this 16 day of August, A. D. 1919.

GEORGE F. GOODING.